(12) United States Patent
Jackson, Sr.

(10) Patent No.: US 6,722,783 B2
(45) Date of Patent: Apr. 20, 2004

(54) X-RAY CHAIR

(76) Inventor: Ronnie W. Jackson, Sr., 1007 Catesby Ct., Landover, Prince Georges County, MD (US) 20785

( * ) Notice: Subject to any disclaimer, the term of this patent is extended or adjusted under 35 U.S.C. 154(b) by 0 days.

(21) Appl. No.: 10/029,996

(22) Filed: Dec. 31, 2001

(65) Prior Publication Data

US 2003/0123616 A1 Jul. 3, 2003

(51) Int. Cl.⁷ .............................................. G03B 42/02
(52) U.S. Cl. ...................................... 378/178; 378/209
(58) Field of Search ................................ 378/177, 178, 378/179, 180, 182, 204, 208, 209

(56) References Cited

U.S. PATENT DOCUMENTS

| | | | |
|---|---|---|---|
| 3,626,186 A | 12/1971 | Allard et al. | 250/50 |
| 3,655,968 A | 4/1972 | Moore et al. | 250/50 |
| 3,795,815 A | 3/1974 | Weinstock et al. | 250/444 |
| 3,892,399 A | 7/1975 | Cabansag | 269/328 |
| 4,044,265 A | 8/1977 | Schmidt | 250/439 |
| 4,229,656 A | * 10/1980 | Iversen et al. | 378/178 |
| 4,589,124 A | * 5/1986 | Ruiz | 378/178 |
| 4,699,425 A | * 10/1987 | Ohlson | 297/344.24 |
| 5,860,808 A | * 1/1999 | Yoshimoto et al. | 434/55 |
| 6,322,250 B1 | * 11/2001 | Pratt | 378/208 |
| 6,398,409 B1 | * 6/2002 | Brooks | 378/209 |

* cited by examiner

*Primary Examiner*—Max Noori
(74) *Attorney, Agent, or Firm*—Lacasse & Associates, LLC; Randy W. Lacasse

(57) ABSTRACT

A portable, padded chair made from X-ray transparent materials is used to comfortably support a patient while taking X-rays for medical diagnostic purposes. The use of X-ray transparent materials reduces the medical assistant's and patient's risk of repeated exposure to unnecessary X-ray levels. Also, the chair allows a patient to remain in a sitting or reclining position while X-rays are taken. A foot pedal and locking wheels allow for easy adjustment of the chair so that the patient is positioned comfortably and securely. A bucky tray, adjustable along the length and width of the chair, and a piano stand fixture, that attaches to the arms of the chair, are used to hold X-ray film cassettes. Additionally, the arm supports are adjustable and capable of being dropped to the side of the chair so a patient is easily transferred to and from a hospital bed.

18 Claims, 5 Drawing Sheets

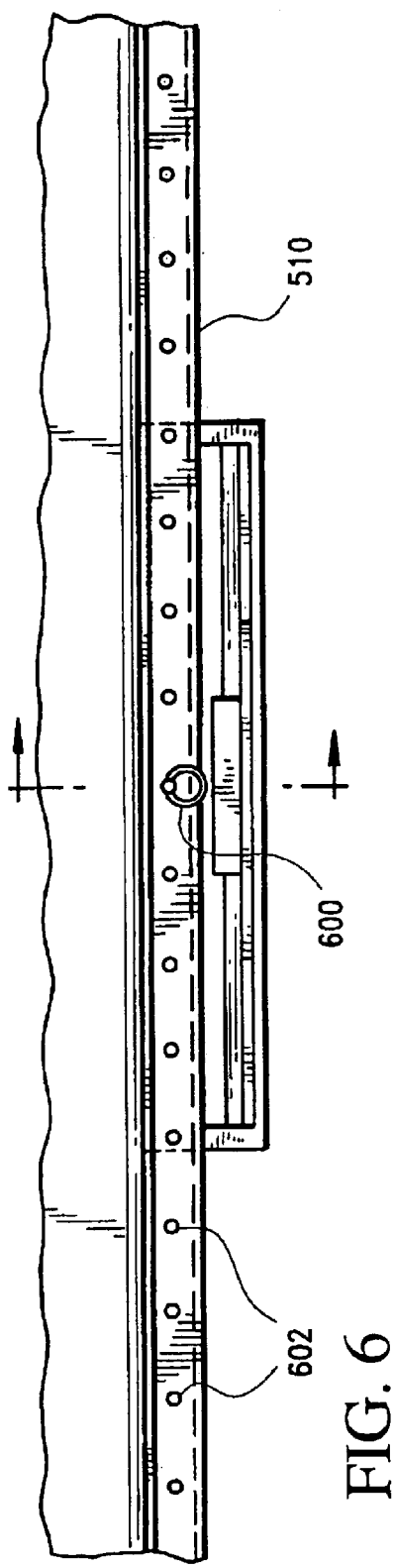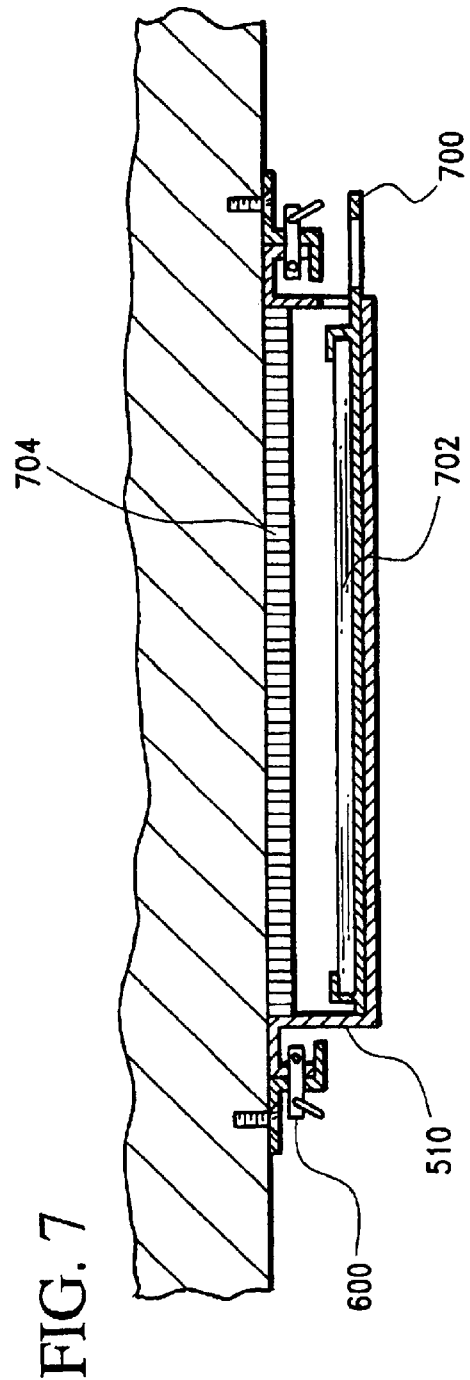

X-RAY CHAIR

BACKGROUND OF THE INVENTION

1. Field of Invention

The present invention relates generally to the field of X-ray imaging. More specifically, the present invention is related to a chair that is used to comfortably support a patient when taking X-rays for medical diagnostic purposes.

2. Discussion of Prior Art

When a patient is very weak, elderly or very young, or otherwise substantially incapacitated, there are a variety of problems that arise when X-ray imagery is needed to further diagnose the patient's condition. While an able-bodied adult can be cooperative for the radiology staff and stand or be seated as needed to get the needed X-ray images, a young child, elderly individual, or person otherwise physically impaired needs assistance from the radiology staff or family members. The patient, therefore, usually requires the aid of several persons for transportation to and from the chair, as well as to and during the X-ray session. Even with fixed X-ray equipment, the help of several people to get the desired X-ray films is required to keep the patient safe. Those facilities that do have portable X-ray equipment for use at a patient's beside still desire several people to aide the patient so that the patient can be held in the proper position to obtain the desired X-rays.

U.S. Pat. No. 3,626,186 describes a wheeled carrier for patients designed to allow X-rays to be taken at several angles without moving the patient out of the chair. The chair also allows film cassettes to be releaseably held on the back and sides of the frame. The frame consists of metal members, and both the seat and back can be made of a padded material or a hard smooth surface such as fiberboard. The reference fails to provide an adjustable x-ray cassette mechanism that can be moved along the length of the patient's body to take x-rays.

U.S. Pat. No. 3,655,968 discusses the use of a swiveling X-ray examination chair that restrains the patient through the use of restraining means to maintain a particular orientation and resist any patient movement. An adjustable X-ray film cassette holder is carried by a support rod and mounted on a swivel axis, allowing for movement and positioning of the holder while obtaining the desired X-ray images.

A tiltable, wheelable chair for retaining a patient in an immobile position for radiographic purposes is discussed in U.S. Pat. No. 3,795,815. An X-ray cassette holder is provided for proper positioning of the area to be examined, preferably the patient's chest, while supporting and retaining the patient in proper position. The chair frame is preferably made of aluminum, with wheels for proper positioning relative to the x-ray device.

U.S. Pat. No. 3,892,399 shows the use of a rigid platform seat member that is used to restrain children while taking X-ray photographs. The base, which supports an adjustable film holder, is adapted to be fixed to a support means and prevent relative movement. Restraining means are preferably adjustable to accommodate to the size of the patient.

A mobile chair for panoramic dental X-rays as described in U.S. Pat. No. 4,044,265 is capable of being locked in a proper position for radiography. Rollers allow the chair to be rolled to and from the machine as needed. For stability, the chair is locked onto the x-ray apparatus while images are taken. An X-ray tube casing and a film holder are provided at one end of the rotatable arm that allow for adjustment to obtain a panoramic view of the patient's mouth.

Although the above inventions utilize the use of a mobile chair for moving and restraining the patient during X-ray sessions, there does not appear to be any mention of the convenience and ease of the chairs for those that aid the patient during the x-ray sessions. Although x-ray film cassettes are provided on both the back and sides of the described inventions above, it appears impossible to collect images from underneath the patient, for areas such as the pelvic region, without moving or positioning the patient's body and restraining it in a proper position. The cooperation of the patient and the cooperation of several persons are therefore required to aide and align the patient and the X-ray cassettes for proper imaging.

Besides the requirement of several individuals during such radiology sessions, an additional downside to such assistance is elevated levels of X-ray exposure to everyone involved. There is special concern for the patient, especially when X-rays are repeated, should the desired image not be acquired on the first take. When patients that need to be X-rayed are assisted while sitting or standing, an X-ray technician or family member (if present) is asked to help the patient in the X-ray room. Therefore, while being x-rayed, even with proper shielding, both the patient and the aide are exposed to X-rays.

Another concern in elevated x-ray levels is the materials that are used in the fabrication of the chair. The improper use of materials (such as those materials that are non-radiopassive) causes a fair amount of ray scattering, therefore not only adversely affecting the desired image, but also the patient and aides involved. Therefore, the elimination of non-radiopassive materials is beneficial for the elimination of magnetic interference. By replacing the chair materials with those that are compatible with X-ray imaging, images can be obtained quickly and more efficiently with less harm to the patient.

Additionally, it is important that during the radiology session the patient is relaxed and willing to work with the medical staff involved. Since the chair eliminates the requirement of the aide of several people, it is much easier on the patient when moving to the chair or to the proper area or department. Also, by providing and constructing the chair of materials that are both visually and physically comforting, the patient will be more cooperative. An aesthetically pleasing chair will not intimidate patients (for example, smaller children) or create phobias (with respect to the patient being seated in the chair) when X-rays are taken.

Whatever the precise merits, features and advantages of the above cited references, none of them achieve or fulfills the purposes of the present invention.

SUMMARY OF THE INVENTION

The X-ray chair of the present invention provides for an X-ray transparent chair that safely and properly supports patients during X-ray imaging sessions. The invention described herein is a portable chair designed to have means for holding film cassettes of all sizes, so that X-rays can be taken at almost any position without removing the patient from the chair. The present invention x-ray chair includes an x-ray cassette holder located under the chair support sections, which is adjustable along the length and width of the chair. A support system enables proper placement and quick linear movement of the cassette tray along the length and width of the patient to enable head to toe x-rays without having to move or manipulate the patient. Additional adjustable piano stand cassette holders are removably attached to the arms of the chair to aid to preparing x-rays of the arms or other frontal extremities.

By minimizing the handling of the patients during the process of the X-ray exam, particularly those patients who are in a lot of pain or very weak, elderly or very young, unable to walk, stand, or sit-up on their own, the process is more relaxed for the patient and more convenient for those that aide the patient. The X-ray chair helps these patients, because of its safety, versatility, and comfort, from their fears of falling from an X-ray table or fears of the imaging machinery used during X-ray sessions. Also, because of the aesthetically pleasing design, the patient is both mentally and physically comfortable while in the chair.

The X-ray chair also allows facilities to provide an inexpensive piece of equipment which permits X-rays to be done quickly while not taking away from the quantity or quality of the X-ray films. In addition, this device enables a single X-ray technologist to change the position of the x-ray imaging cassettes with respect to the patient quickly with minimum effort and discomfort to the patient. The chair, along with the use of suitable materials with this design, benefits the medical staff by limiting the exposure to unnecessary X-ray levels when they would otherwise have to physically hold and support the patient during an X-ray session. Also, the use of X-ray transparent materials throughout construction of the chair allows quality X-ray images to be obtained in any patient position needed for medical diagnostic purposes.

BRIEF DESCRIPTION OF THE DRAWINGS

FIG. 6 illustrates a side view of the locking feature of the support mechanism.

FIG. 7 illustrates a sectional view of the support mechanism.

DESCRIPTION OF THE PREFERRED EMBODIMENTS

Figure 1:
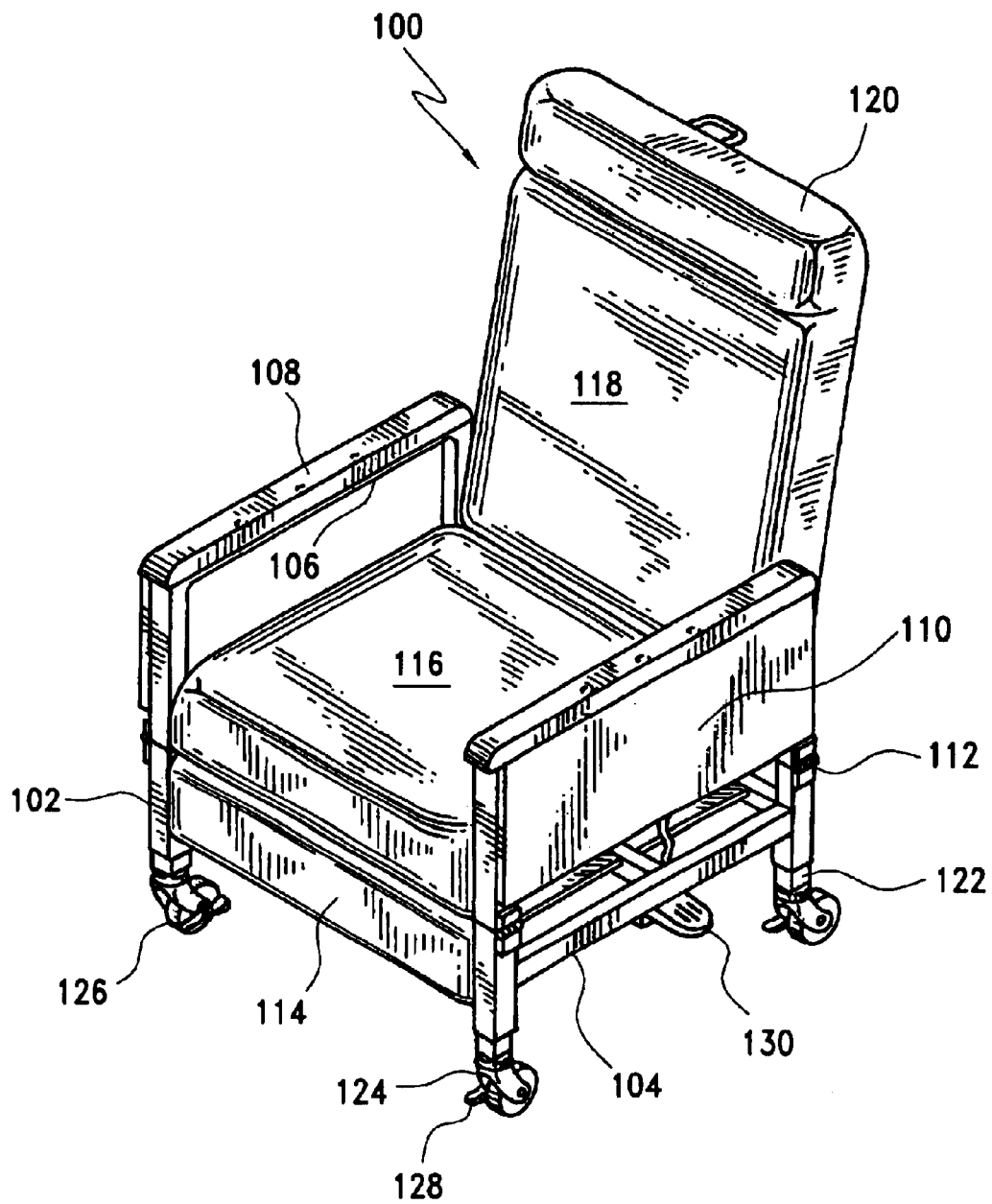
FIG. 1 illustrates a frontal view of the X-ray chair.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
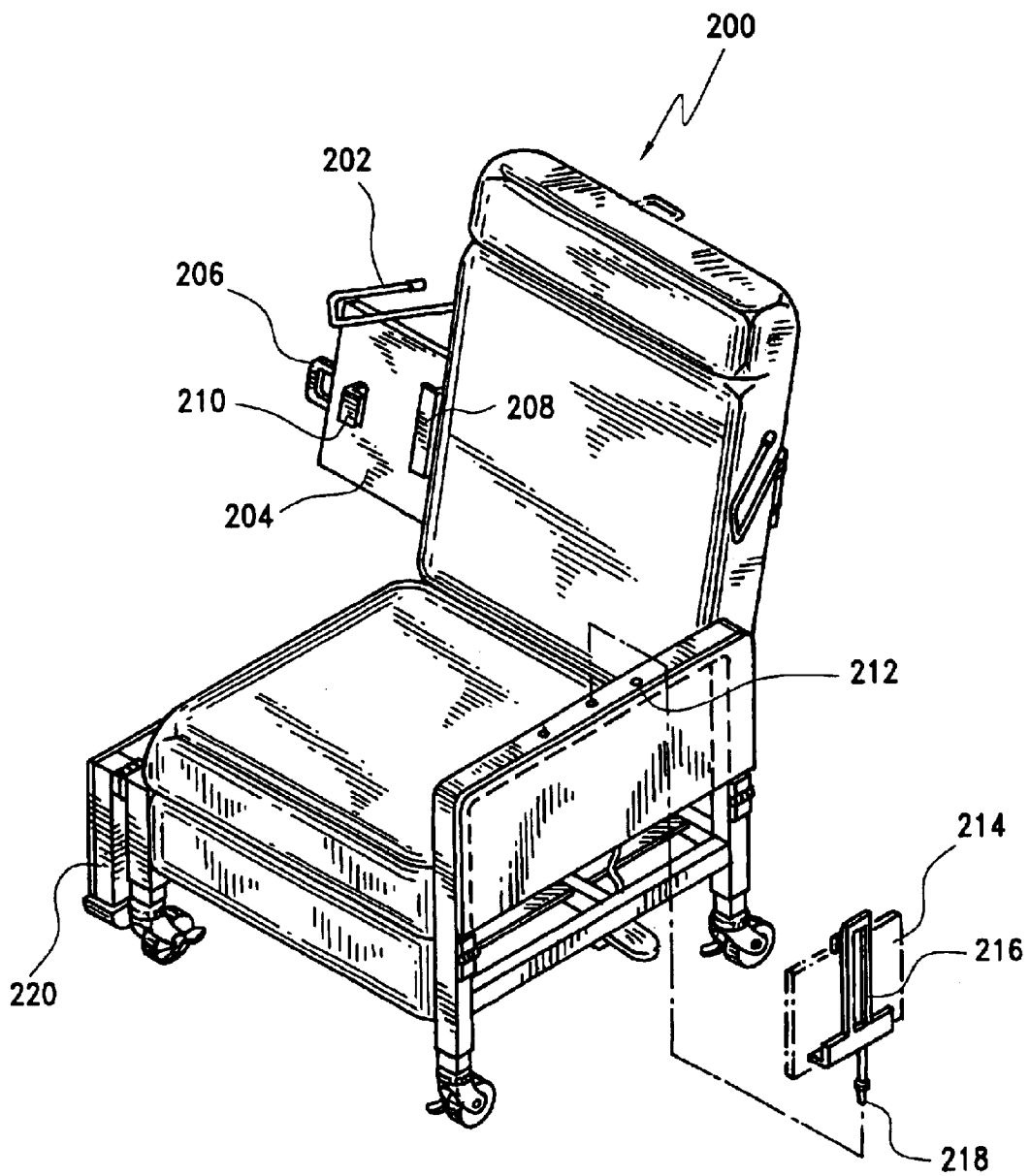
FIG. 2 illustrates a detailed view of the accessories provided on the X-ray chair.

FIG. 1 illustrates a left front view of the X-ray chair 100 in an upright position. Chair 100 mainly comprises a lightweight frame consisting of legs 102, horizontal bar supports 104 to provide stability, and arms 106 with corresponding removable arm rest covers 108. Attached to arms 106 on both the right and left sides are arm supports 110 with means mounted adjacent the seat that are used to hold additional imaging means. Arms 106 are attached to legs 102 via bolt brackets 112. Brackets 112 allow arms 106 to be folded down and against legs while taking X-rays, as seen in FIG. 2. Chair 100 also comprises footrest 114, seat 116, back 118, and head cushion 120. Seat 116 is preferably padded with a cushion for comfort and elevated above frame members so that a bucky tray (further described below) passes beneath seat for X-rays of the pelvic regions. Back 118 is preferably a padded surface that is radiolucent.

Attached to the bottom of frame legs 102 are mounting brackets 122 that are used to attach casters 124 and rubber wheels 126 for guided movement thereto. Break stops or locks 128 are provided on the wheels. The use of locking wheels allows the chair to not only be transportable, but also allows its use along with a portable X-ray machine in the patient's room instead of having to transport the patient to another department. If the present invention is used in the radiology department on a regular basis, X-ray imaging is safer and more convenient for all involved.

Foot pedal 130, which is shown in FIG. 1 on the left side, but is preferably on both sides, is provided for height adjustment, i.e., to raise and lower the chair as needed, for positioning purposes such as being transferred onto the chair or for obtaining suitable images. Additionally, safety straps are provided (not shown) to secure a patient during transport or X-ray sessions.

The preferred structural components of the present invention are preferably compression-molded from fiberglass to eliminate the use of non-radiopassive materials in the frame. As previously mentioned, not only do non-radiopassive materials block X-ray imagery, but such materials also cause a fair amount of ray scattering that adversely affects a desired image. Using compression-molded fiberglass as the structural components for the above-described frame reduces such scattering effects so that the desired image is obtained on the first take. These structure members are also on the perimeter of the imaging areas where they little harm of imagery needs is done.

Although compression-molded fiberglass is the preferred material for the frame, additional radiopassive materials, such as common metals, may also be used. In addition, those materials having stealth-like X-ray features, much like the qualities of a military aircraft, being essentially transparent to X-ray wavelengths, while still providing a comfortable and safe support means to position a patient, are also substitutable. Such features are obtained through the intelligent selection of materials and placing structural components outside areas that might otherwise interfere with quality X-ray imagery.

The described seat cushion or padding is preferably die cut from medium density polyethylene or a similar X-ray transparent foam padding material. Additionally, the seat exterior or cushion coverage is preferably made of Teflon® sheet stock. Both materials comfortably support the patient while also allowing the X-ray wavelengths to pass with very little attenuation. Again, other X-ray transparent materials may be used.

FIG. 2 again illustrates a front view of X-ray chair 200 in an upright position with a more detailed description of the accessories that are used during X-ray imaging. Provided on both the right and left sides of the seat is cross bar handle 202, which is used to hold a patient's arms up and out of the way during imaging. FIG. 4 best illustrates cross bar handle 202 at full extension. Extending from the back of the chair (see also FIG. 3) is bucky tray 204. Bucky tray 204 is provided on the back of the supporting pad of the chair to accept X-ray film cassettes for taking X-rays. Bucky tray 204 comprises handle 206 for pushing or pulling the tray in the direction needed, i.e., left, right, up, down, and underneath the chair. Inner and outer cassette holders 208 and 210 for holding an X-ray film cassette can also be seen on bucky tray 204. A locking feature, preferably a twisting pin provided below the tray handle, secures the X-ray cassette to hold it steady while the X-ray is taken (see FIG. 6). Tray 204 preferably includes a built in focusing grid, and is moved by a support mechanism, such as cables, wires, or similar supports, such as a supportive frame. The grid in tray 204 acts as a shield that filters and reduces the scattering of x-rays for developing a clear picture (see FIG. 7). The supportive mechanism also allows bucky tray 204 to slide from the patient's head to feet when the chair is in the extended (flat) position (see FIG. 5). Therefore, the proper x-ray images that are required are obtained easily without disturbing the patient, particularly those who are weak, elderly, unable to walk, etc., and with little effort.

Also shown in FIG. 2 are holes 212 as provided on the arms of the chair. Once armrest covers (108) are removed, holes 212 are revealed. A piano stand 214, or functionally similar object, consisting of a frame 216 and pole insert 218, holds an X-ray film cassette and is placed in the preferred hole 212 during imaging on right or left side. Preferably, there are three holes on the chair's arm to allow for ample movement and alternating positions. For common chest X-rays, the piano stand, made from X-ray transparent material, is positioned on either the right or left side. Side arms of the chair are dropped to the side 220 and the cross bar handle is positioned for the patient to hold onto, keeping the patient's arms out of the way and desired lateral X-ray image is readily obtained. FIG. 4 best illustrates a side view 400 of this extended position.

Figure 3:
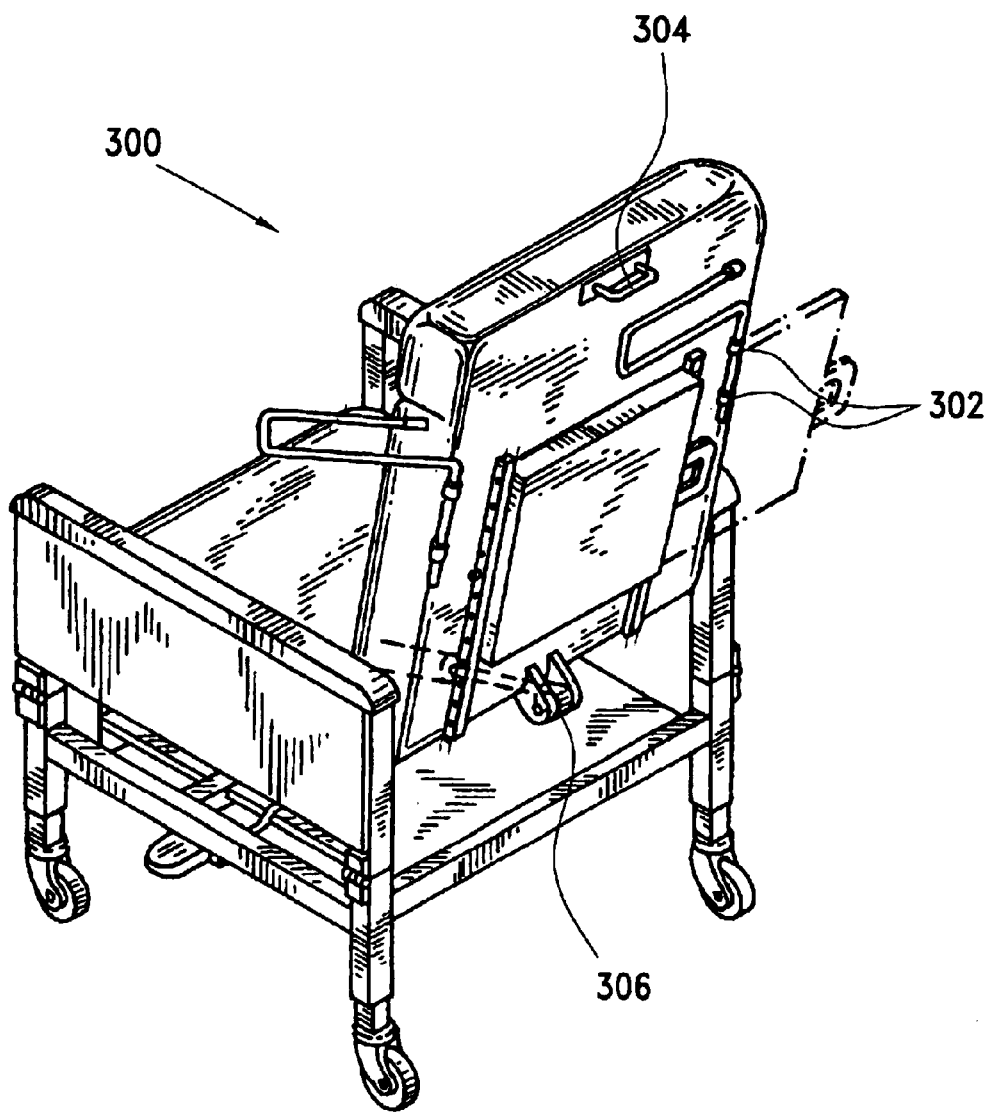
FIG. 3 illustrates a back view of the X-ray chair.
Figure 4:
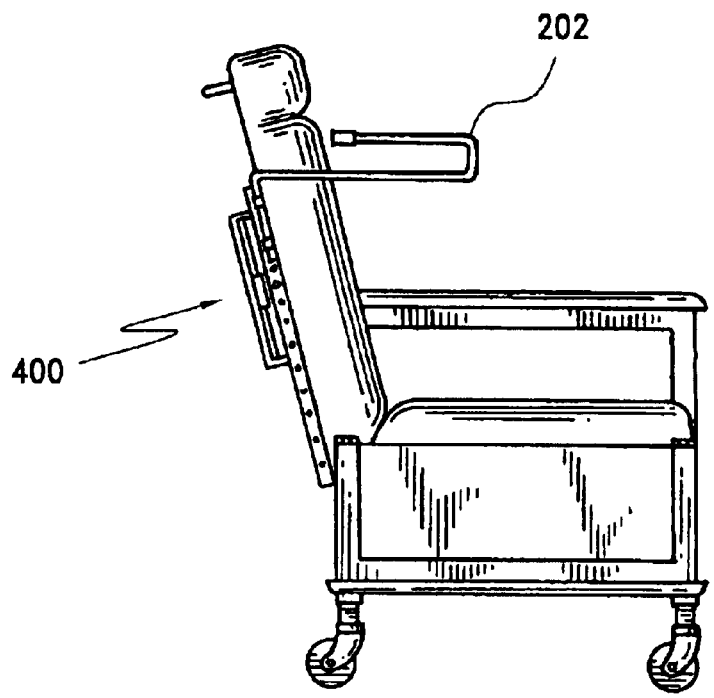
FIG. 4 illustrates a side view of the X-ray chair.

FIG. 3 illustrates a backside view of the X-ray chair 300. Here it can be seen that bolt brackets 302 are used to hold cross bar handles, as described above, locked in place. Illustrated in detail are the features that are used to recline the seat of the X-ray chair. Handle 304 is depressed, and therefore actuates pivot bracket 306, preferably hydraulically. When depressed and held, chair back and legs are adjustable from 90 to zero degrees. The X-ray chair will then stay in this position. When the handle is released from the depressed position, the chair is adjustable from zero to 90 degrees (in full upright position). Arms are adjustable to be flush with the side of the chair so a patient is easily transferred to/from a hospital bed.

Figure 5:
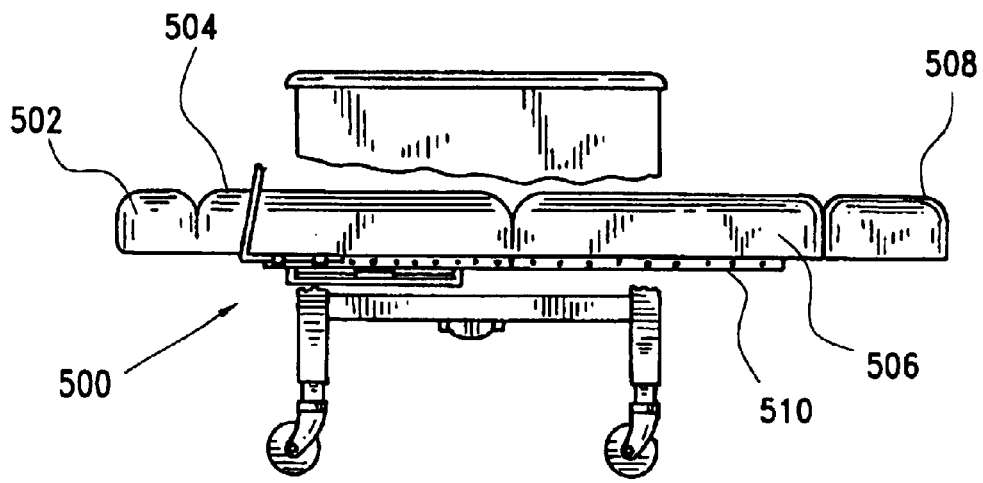
FIG. 5 illustrates a side view of the X-ray chair when fully extended.

FIG. 5 illustrates a full extension of the x-ray chair with both arms of unit up (with footrest showing) after the actuation of pivot bracket 306. Headrest 502, back 504, seat 506, and footrest 508 are extended to allow a patient to lie flat, i.e. the proper x-ray images that are required are obtained easily without disturbing the patient, particularly those who are weak, elderly, unable to walk, etc., and with little effort. Again, support mechanism 510, such as cables, wires, or similar supports, such as the illustrated supportive frame, allows bucky tray (204) to slide from the patient's head to feet when the chair is in the extended (flat) position.

Support mechanism 510 for the bucky tray is illustrated in detail in FIGS. 6 and 7. FIG. 6 illustrates locking feature 600, previously described as a twisting pin provided below the tray handle, that secures the X-ray cassette to hold it steady while the X-ray is taken. As seen, a plurality of holes 602 are provided in the support mechanism for easy adjustment of the position of the bucky tray.

FIG. 7 illustrates a sectional view of the support mechanism 510. Again, locking mechanism 600 can be seen. A detailed view of the bucky tray 700, holding X-ray cassette 702 on the support mechanism 510 in front of the previously mentioned focusing grid 704, is shown. Focusing grid 704 acts as a shield to filter and reduce the scattering of x-rays for developing a clear picture. Grid 704 is built in bucky tray 700 and moves along with the tray 700 as it is adjusted up and down the support mechanism.

CONCLUSION

A system and method has been shown in the above embodiments for the effective implementation of an X-ray chair. While various preferred embodiments have been shown and described, it will be understood that there is no intent to limit the invention by such disclosure, but rather, it is intended to cover all modifications and alternate constructions falling within the spirit and scope of the invention, as defined in the appended claims. Specific examples of seat cushion material (polyethylene) and seat exterior material (Teflon®) are provided for illustrating the preferred embodiment of the present invention, and thus should not be used to limit the scope of the present invention. Therefore, one skilled in the art of X-ray diagnostics and imaging can envision other X-ray transparent materials for use with the X-ray chair of the present invention.

What is claimed is:

1. A mobile, adjustable x-ray imaging chair including a light-weight frame, said light-weight frame having adjustable arm supports with arm rests, a footrest, seat, back, head cushion, and foot pedal for height adjustment of said chair, said chair comprising:
    a first x-ray cassette holder, said holder retaining a plurality of sizes of x-ray film cassettes,
    a support mechanism, said mechanism provided proximal to a rearward surface of said head cushion, back, seat, and footrest, said support mechanism receiving said first x-ray cassette holder and providing translation of said first x-ray cassette holder along the length and width of an underside of said chair, and
    a second x-ray cassette holder, said second x-ray cassette holder comprising a portable x-ray film cassette holder selectively retained within receiving sections of the arm of said chair, and wherein said holder comprises a piano stand structure, said structure comprising a frame, said frame retaining a plurality of sizes of x-ray film cassettes, and a pole insert, said pole insert being positioned into said receiving sections located within the arm of said chair.

2. A mobile, adjustable x-ray imaging chair as per claim 1, wherein said lightweight frame is x-ray transparent.

3. A mobile, adjustable x-ray imaging chair as per claim 1, wherein said frame comprises compression-molded fiberglass.

4. A mobile, adjustable x-ray imaging chair as per claim 1, wherein said footrest, seat, back, and head cushion comprise x-ray transparent inner cushion padding foam materials.

5. A mobile, adjustable x-ray imaging chair as per claim 1, wherein said footrest, seat, back, and head cushion comprise inner cushion padding foam material die cut from medium density polyethylene.

6. A mobile, adjustable x-ray imaging chair as per claim 1, wherein said outer cushion cover material of said footrest, seat, back, and head cushion comprise x-ray transparent materials.

7. A mobile, adjustable x-ray imaging chair as per claim 1, wherein said outer cushion cover material of said footrest, seat, back, and head cushion comprise Teflon sheet stock.

8. A mobile, adjustable x-ray imaging chair as per claim 1, wherein said seat comprises, on either side, a cross bar handle, said cross bar handle supporting the upper extremities of a patient in said chair during x-ray imaging.

9. An adjustable x-ray imaging chair, said chair including a frame, said frame having adjustable arm supports with arm rests, a footrest, seat, back, head cushion, said chair comprising:
- a first x-ray cassette holder, said holder retaining a plurality of sizes of x-ray film cassettes,
- a support mechanism providing translation of said first x-ray cassette holder along the length and width of an underside of said chair, and
- a second x-ray holder, said holder comprising a structure, said structure comprising a frame retaining a plurality of sizes of x-ray film cassettes, and
- wherein said holder is removably attached to the arm of said chair.

10. An adjustable x-ray imaging chair, said chair comprising:
- a frame, said frame comprising at least: adjustable arm supports with arm rests, a footrest, seat, back, and head cushion,
- said frame substantially transparent to x-rays;
- a first x-ray cassette holder adjustable along one or both of the length and width axis of said frame;
- a second x-ray cassette holder removably attached to said adjustable arm supports, and
- wherein said chair provides for taking a multiplicity of x-rays without removing a patient from the chair.

11. An adjustable x-ray imaging chair as per claim 9, wherein said portable x-ray film cassette holder comprises a piano stand structure, and a pole insert, said pole insert being positioned into said receiving sections located within the arm of said chair.

12. An adjustable x-ray imaging chair as per claim 9, wherein said lightweight frame is x-ray transparent.

13. An adjustable x-ray imaging chair as per claim 9, wherein said frame comprises compression-molded fiberglass.

14. An adjustable x-ray imaging chair as per claim 9, wherein said footrest, seat, back, and head cushion comprise x-ray transparent inner cushion padding foam materials.

15. An adjustable x-ray imaging chair as per claim 9, wherein said footrest, seat, back, and head cushion comprise inner cushion padding foam material die cut from medium density polyethylene.

16. An adjustable x-ray chair as per claim 9, wherein said outer cushion cover material of said footrest, seat, back, and head cushion comprise x-ray transparent materials.

17. An adjustable x-ray imaging chair as per claim 9, wherein said outer cushion cover material of said footrest, seat, back, and head cushion comprise Teflon sheet stock.

18. An adjustable x-ray imaging chair as per claim 9, wherein said seat comprises, on either side, a cross bar handle, said cross bar handle supporting the upper extremities of a patient in said chair during x-ray imaging.

* * * * *

UNITED STATES PATENT AND TRADEMARK OFFICE
CERTIFICATE OF CORRECTION

PATENT NO. : 6,722,783 B2  Page 1 of 1
DATED : April 20, 2004
INVENTOR(S) : Ronnie W. Jackson, Sr.

It is certified that error appears in the above-identified patent and that said Letters Patent is hereby corrected as shown below:

Title page,
Item [54], Title, should read -- X-RAY CHAIR PROVIDING TRANSLATION OF CASSETTE HOLDERS --.

Column 1,
Line 26, replace "beside" with -- bedside --.
Line 26, replace "aide" with -- aid --.

Column 2,
Lines 12 and 39, replace "aide" with -- aid --.
Line 48, replace "fulfills" with -- fulfill --.

Coumn 3,
Line 6, replace "aide" with -- aid --.

Column 4,
Line 33, replace "they little" with -- they could do little --.
Line 34, replace "of imagery" with -- in terms of imagery --.

Column 5,
Line 16, replace "(108)" with -- 108 --.

Signed and Sealed this

Twenty-fifth Day of April, 2006

JON W. DUDAS
*Director of the United States Patent and Trademark Office*